(12) United States Patent
Tsukimura

(10) Patent No.: US 7,362,467 B1
(45) Date of Patent: Apr. 22, 2008

(54) IMAGE PROCESSING DEVICE AND IMAGE PROCESSING METHOD THEREOF

(75) Inventor: Shigeru Tsukimura, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/450,584

(22) Filed: Nov. 30, 1999

(30) Foreign Application Priority Data

Feb. 9, 1999 (JP) ................................ 11-031897

(51) Int. Cl.
*G06K 15/00* (2006.01)
*G06F 3/12* (2006.01)

(52) U.S. Cl. ...................................... 358/1.9; 358/3.27

(58) Field of Classification Search ................. 358/1.9, 358/3.15, 3.27, 1.15, 518; 382/266, 268, 382/269, 274, 199
See application file for complete search history.

(56) References Cited

U.S. PATENT DOCUMENTS

| | | | | |
|---|---|---|---|---|
| 5,313,570 A | * | 5/1994 | Dermer et al. .............. | 345/589 |
| 5,777,758 A | | 7/1998 | Tanabe ....................... | 358/1.9 |
| 5,784,172 A | * | 7/1998 | Coleman ..................... | 358/1.9 |
| 5,848,225 A | * | 12/1998 | Nickell et al. ............... | 358/1.9 |
| 5,923,821 A | * | 7/1999 | Birnbaum et al. ........... | 358/1.9 |
| 6,259,536 B1 | * | 7/2001 | Coleman ..................... | 358/1.9 |
| 6,433,889 B1 | | 8/2002 | Tanabe ....................... | 358/1.9 |

FOREIGN PATENT DOCUMENTS

| | | |
|---|---|---|
| JP | HEI. 61-013261 | 1/1986 |
| JP | HEI. 05-282500 | 10/1993 |
| JP | 6-339037 | 12/1994 |
| JP | 7-212608 | 8/1995 |
| JP | HEI. 08-030063 | 2/1996 |
| JP | 10-52947 | 2/1998 |

* cited by examiner

*Primary Examiner*—Gabriel I. Garcia
(74) *Attorney, Agent, or Firm*—Morgan, Lewis & Bockius LLP

(57) ABSTRACT

The image processing device and method of the present invention prevent a problem such as misregistration and a phenomenon that an edge pales, and enable high speed output in a color printer and a color copying machine. The color materials of Y, M, C of a predetermined amount are output onto a black object regardless of peripheral pixel values and thereby a phenomenon that an edge pales is prevented. In the edge of the black object, trapping processing according to peripheral pixel values is executed and a problem due to misregistration is made inconspicuous.

17 Claims, 16 Drawing Sheets

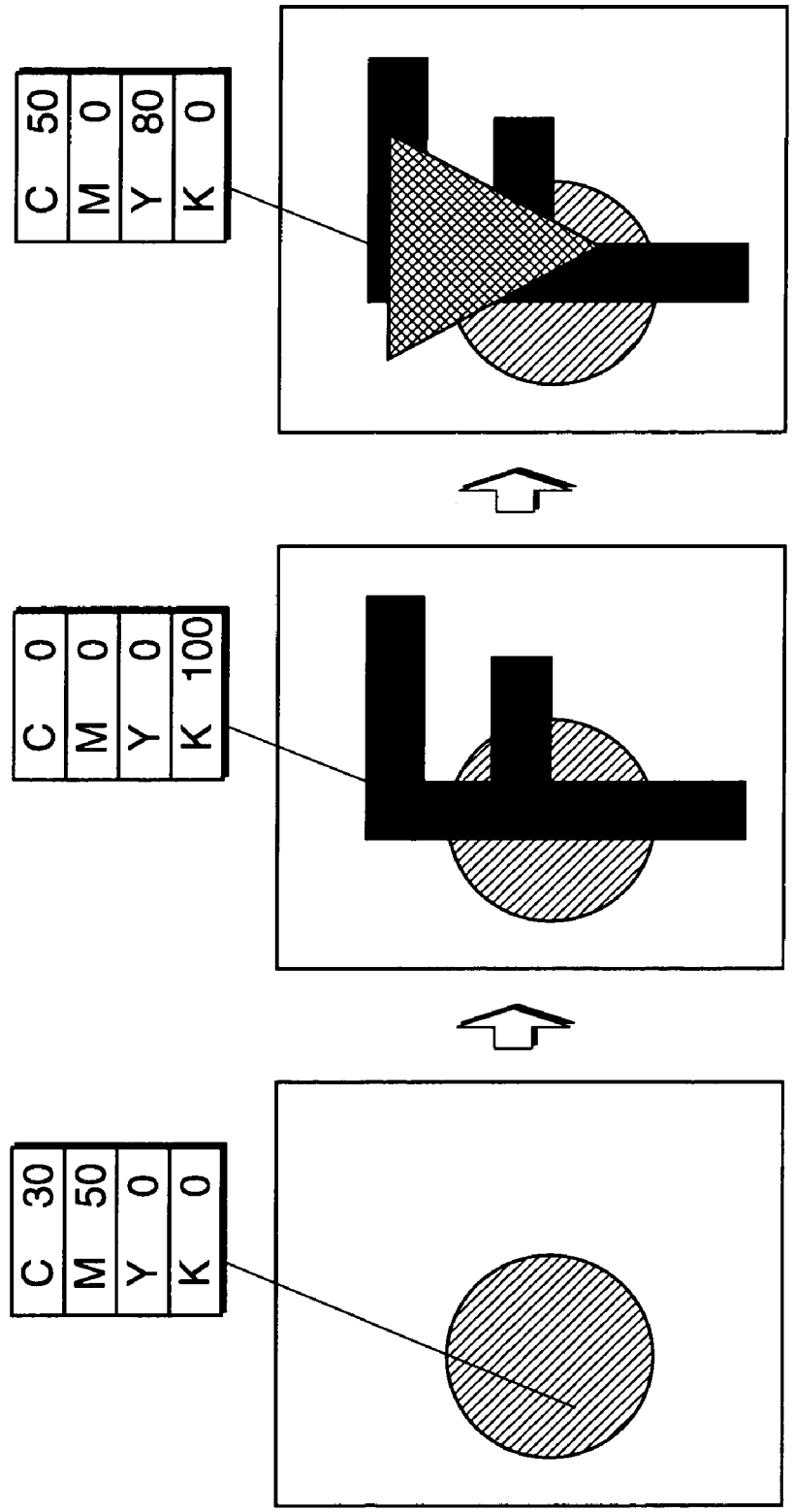

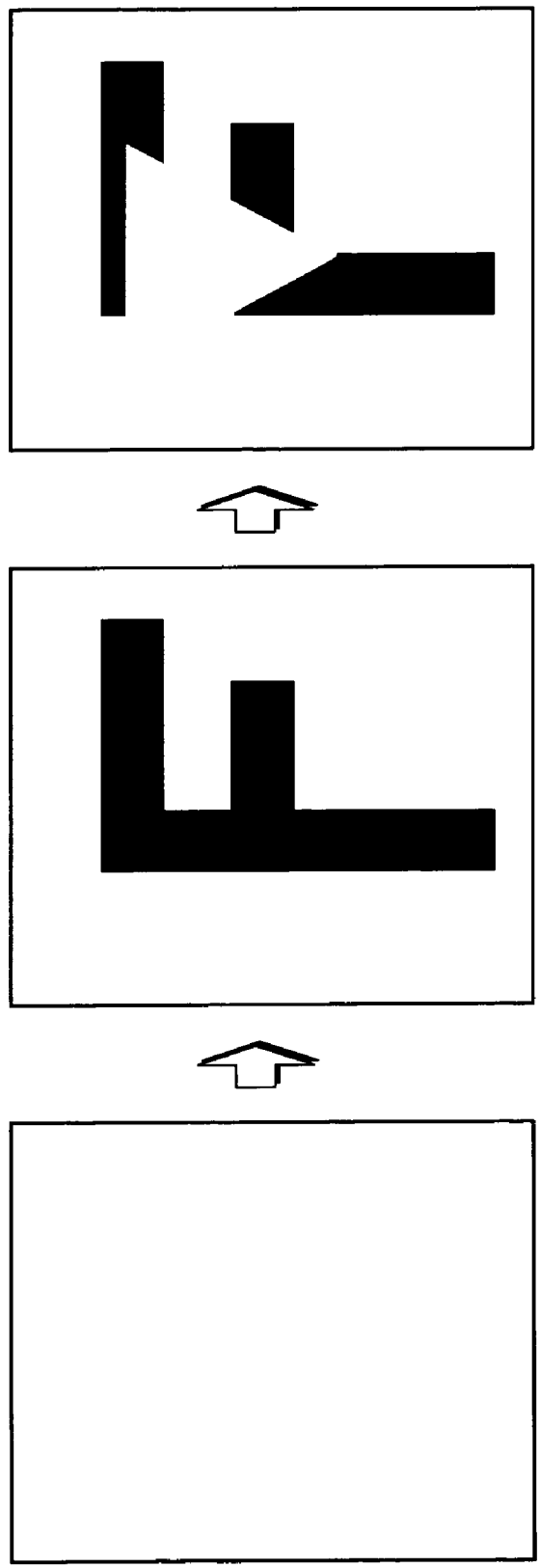

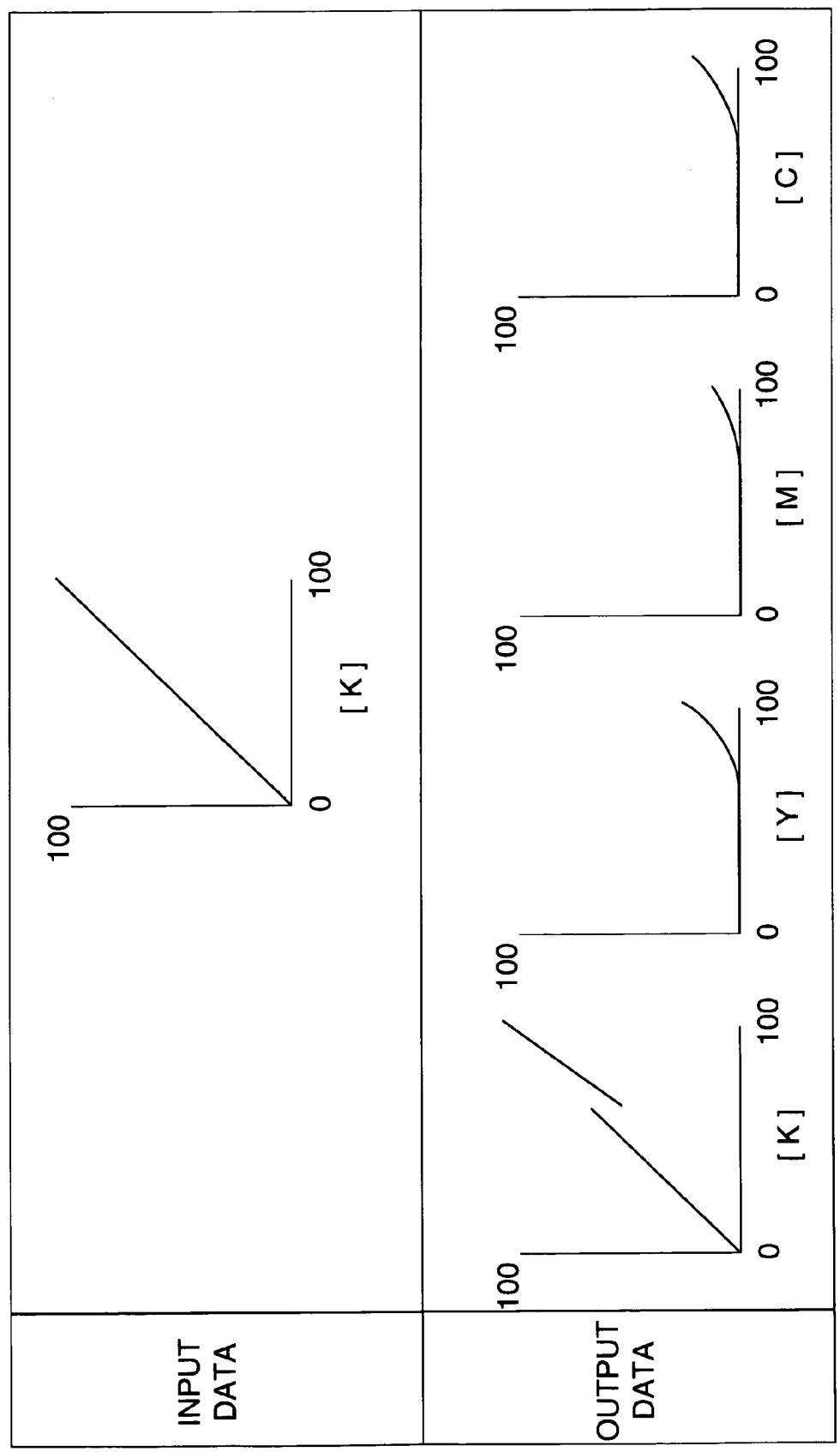

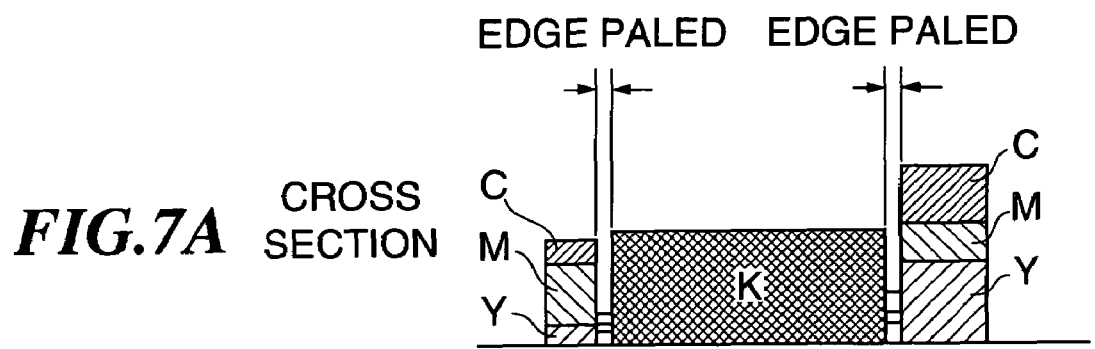
FIG. 7A CROSS SECTION
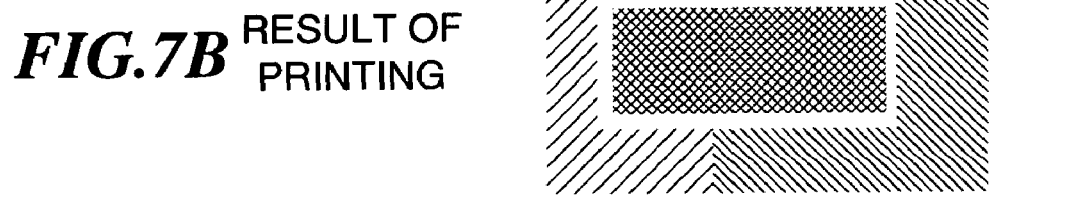
FIG. 7B RESULT OF PRINTING
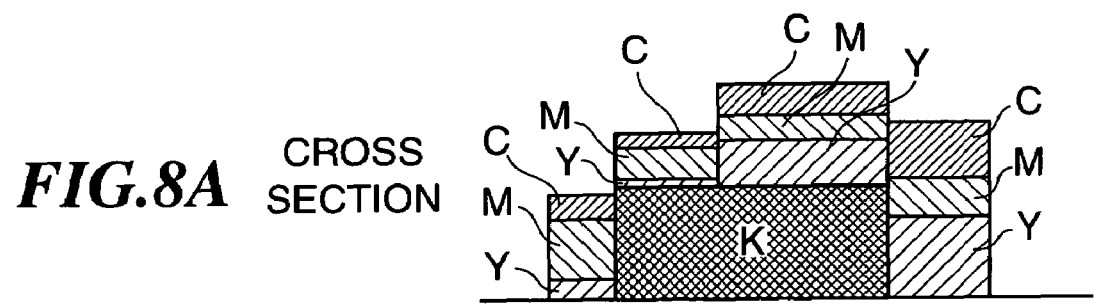
FIG. 8A CROSS SECTION
FIG. 8B RESULT OF PRINTING

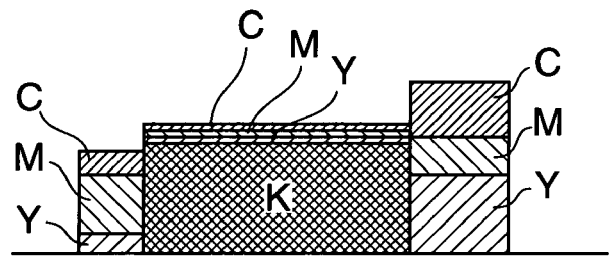
FIG.9A CROSS SECTION
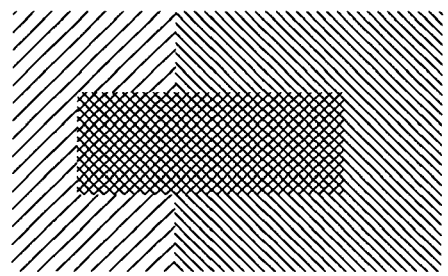
FIG.9B RESULT OF PRINTING

FIG. 13
EXAMPLES OF NEAR PIXELS
NEAR 4 PIXELS
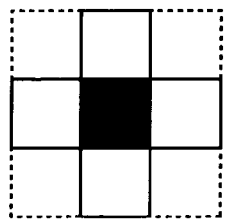
NEAR 8 PIXELS
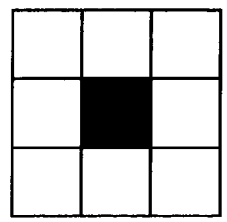
NEAR 12 PIXELS
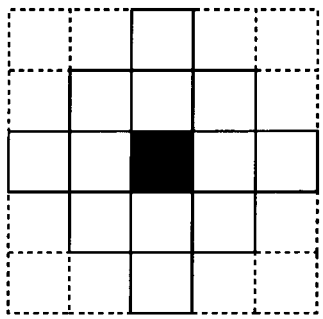
NEAR 20 PIXELS
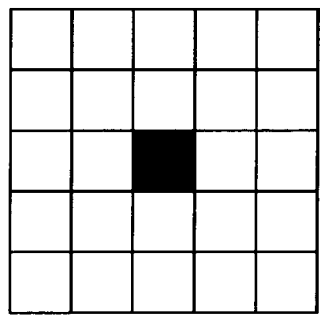
FIG. 14
CASE THAT TOTAL AMOUNT OF COLOR MATERIAL COMES INTO QUESTION
$Pc(x,y) + Pm(x,y) + Py(x,y) + Pk(x,y)$
$= (30 + 50 + 100) / 3$
$+ (100 + 30 + 50) / 3$
$+ (100 + 30 + 80) / 3$
$+ 100$
$= 60 + 60 + 70 + 100$
$= 290$

METHOD OF CALCULATING DENSITY OF TRAPPED PIXEL

METHOD OF CALCULATING DENSITY OF TRAPPED PIXEL $P(x,y) = (pc(1) + Pc(2)) / 2$

*FIG.16A* BIT MAP DATA
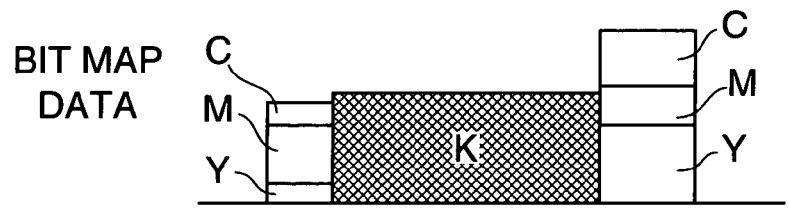
*FIG.16B* CROSS SECTION
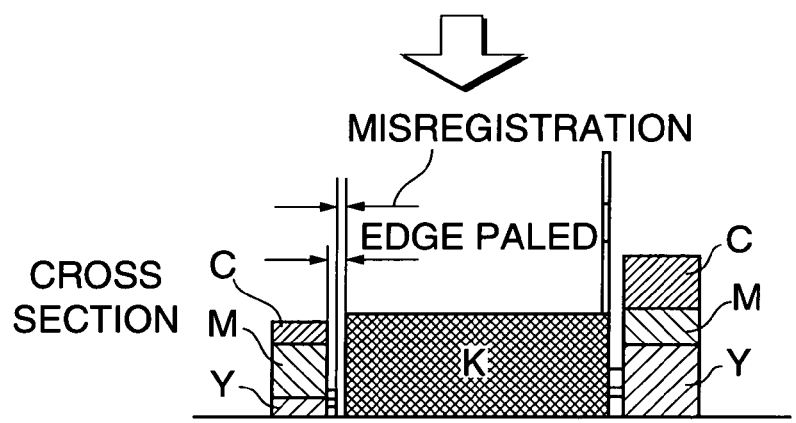
*FIG.16C* RESULT OF PRINTING
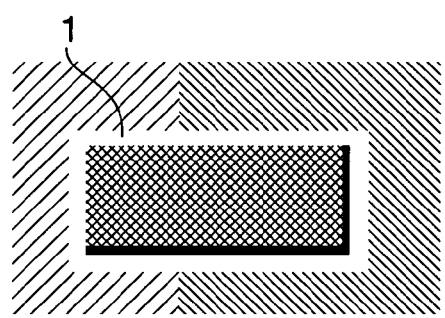

*FIG. 17A* BIT MAP DATA 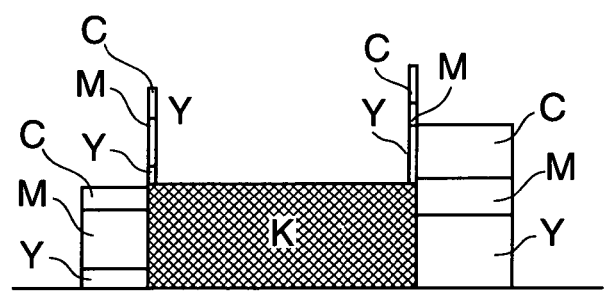
*FIG. 17B* CROSS SECTION 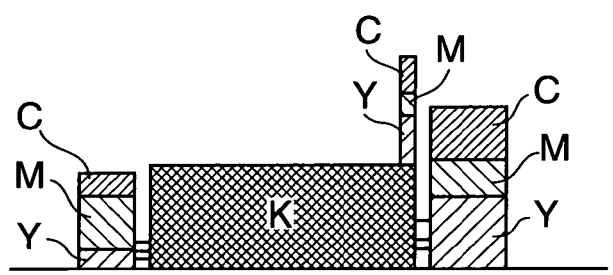
*FIG. 17C* RESULT OF PRINTING 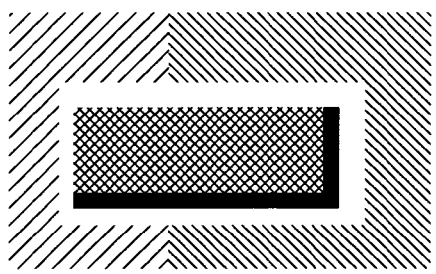

*FIG.18A* BIT MAP DATA 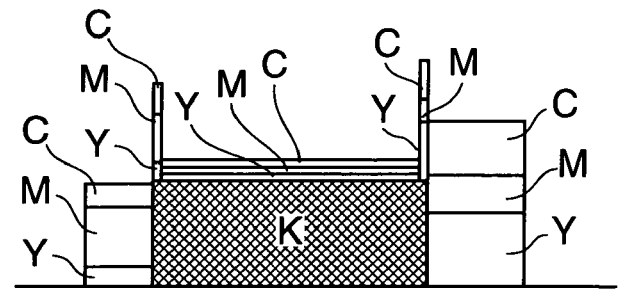
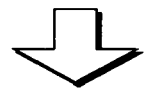
*FIG.18B* CROSS SECTION 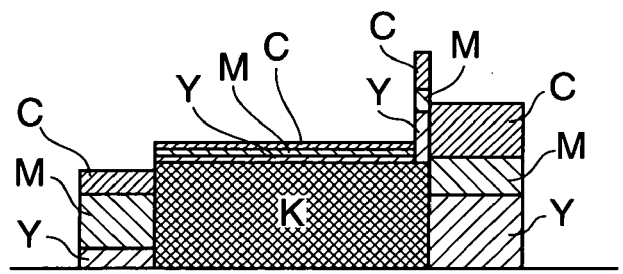
*FIG.18C* RESULT OF PRINTING 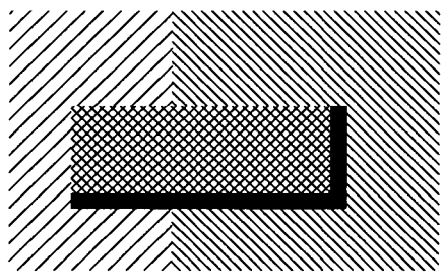

IMAGE PROCESSING DEVICE AND IMAGE PROCESSING METHOD THEREOF

BACKGROUND OF THE INVENTION

1. Field of the Invention

The present invention relates to an image processing device and an image processing method suitable for a color copying machine and a color printer.

2. Description of the Related Art

In a color copying machine and a color printer, generally, each color is represented according to the amount of the output color material of each primary color composed of black (K), yellow (Y), magenta (M) and cyan (C). If a black character and others are printed on a color graphic form and a color picture, a part overlapped with a black character of a background is first blanked. As for image data having a black character A on a photograph image including YMC, a background area is equivalent to an area except the character A of the original photograph image and a black area is an area equivalent to a part of the character A. A character, a graphic form, a photograph and others are generically called an object.

In electrophotography, a process in which the color material of KYMC is adhered to paper is independently executed every color. Therefore, the relative position of an image in each color may be displaced by a few pixels due to mechanical positional precision, the variation of the speed of paper feeding and the displacement of a carriage belt. In the above example, a white contour not existing originally is formed in a direction of the contour of the black character A. In this specification, such a problem is called misregistration.

Also, in electrophotography, an electrostatic latent image is formed on a drum provided every color of KYMC and color material is absorbed. When an electrostatic latent image in Y, M, C of the above photograph image is formed, an electrostatic latent image electric charge in only a part of the character A of which is zero is formed. In this case, a phenomenon that a photograph image pales in a larger range than a range of misregistration occurs because slight electric charge moves from the periphery to a part in which electric charge is zero and because of the others. In this specification, such a problem is called a phenomenon that an edge pales.

FIGS. 7 and 16 respectively show an example in case the above problem occurs. In the example shown in FIG. 7, only the phenomenon that an edge pales occurs in a little large range and no misregistration occurs. Further, in FIG. 16, misregistration occurs in a little small range around a black image in the center in addition to the phenomenon that an edge pales. In electrophotography, when the total amount in case a plurality of color materials are overlapped exceeds allowable amount, a failure of fixing occurs, color material may peel from paper and a printer may be damaged. Such a problem is called an over state in color material total amount.

In Japanese Published Unexamined Patent Application No. Hei 10-52947, background color under a black object is checked every pixel, according to the result, the composition and amount of color material for outputting the black object are determined and hereby, technique for preventing the phenomenon that an edge pales is disclosed. That is, the black object is not output depending upon only black color material but color material in Y, M, C is suitably added according to the background color.

Also, in Japanese Published Unexamined Patent Applications No. Hei 6-339037 and No. Hei 7-212608, technique for preventing a void caused by misregistration by trapping the contour of an object (slightly overlapping the color material of both objects) is disclosed. That is, a series of processing that (1) the contour of the object is detected, (2) referring to an adjacent pixel of each contour, it is determined whether trapping is to be performed or not, (3) in consideration of a value of each adjacent pixel, a value of a target pixel is calculated is executed.

However, in technique disclosed in the Japanese Published Unexamined Patent Application No. Hei 10-52947, as background color is checked in units of pixel and according to the result, the composition and amount of color material are required to be determined, there is a problem that much time is required. As the composition and amount of color material for printing a black object differ depending upon a place as shown in FIG. 8 even if the color of the black object in original image data is fixed, there is a problem that a single object looks like a set of a plurality of black objects. Further, as the bit map information of a plurality of color materials is required to be all stored, enormous storage capacity is required.

Also, according to the technique disclosed in the Japanese Published Unexamined Patent Applications No. Hei 6-339037 and No. Hei 7-212608, misregistration which occurs in a relatively small range can be prevented by trapping, however, it is difficult to prevent a phenomenon that an edge pales which occurs in a larger range.

SUMMARY OF THE INVENTION

The present invention provides an image processing device and an image processing method effectively preventing a phenomenon that an edge pales and enabling high-speed processing.

The image processing device of the present invention has an input part to which image data represented by multiple colors including black is input, and a black area detector that detects a black area in the image data. The device also has an output part that adds color materials, except a black material, of a predetermined amount to the black area regardless of contents of the image data in a background of the black area and outputs the color materials and the black material.

The present invention also provides an image processing device having an input part to which image data represented by multiple colors including black is input, a black area detector that detects a black area in the image data, and an edge detector that detects an edge of the black area. The device also has an output part that adds color materials, except a black material, of an amount according to colors in the periphery of the edge to the edge, adds the color materials, except the black material, of a predetermined amount to the black area except the edge regardless of contents of the image data in a background of the black area, and outputs the color materials and the black material.

The image processing device may further have an adjuster that adjusts the amount of the color materials except the black material added to the edge in case a total amount of the color materials and the black material to be output to the edge exceeds a predetermined amount.

In the image processing device, the output part may be based upon primary colors of black (K), yellow (Y), magenta (M) and cyan (C), and an amount of each color material of the Y, M, C may be output to the black area in a range of 10 to 40% (percentage by weight) of the amount of the black material.

The image processing device may further have a reduction unit that reduces the amount of the color material of the Y, M, C, keeping the amount of the black material in case a total amount of the color materials of K, Y, M, C exceeds a predetermined value.

The present invention further provides an image processing device having an input part to which image data represented by multiple colors including black is input, a black area detector that detects a black area in the image data, and an image determination unit that determines a type of an image in each area in the image data. The device also has an output part that adds color materials, except a black material, of a predetermined amount to an area determined to hold a predetermined type by the image determination unit and detected as a black area by the black area detector regardless of contents of the image data in a background of the black area and outputs the color materials and the black material.

In the image processing device, the output part may add color materials, except the black material, of a predetermined amount to an area determined to hold a character by the image determination unit and detected as a black area by the black area detector regardless of contents of the image data in a background of the black area, and outputs the color materials and a black material.

The image processing method of the present invention has the steps of inputting image data represented by multiple colors including black, detecting a black area in the image data, and adding color materials, except a black material, of a predetermined amount to the black area regardless of contents of the image data in a background of the black area and outputting the color materials and the black material.

The present invention also provides an image processing method having the steps of inputting image data represented by multiple colors including black, and adding color materials, except a black material, of a predetermined amount to an area determined to hold a predetermined image type and detected as a black area from among areas in the image data regardless of contents of the image data in a background of the black area, and outputting the color materials and the black material.

BRIEF DESCRIPTION OF THE DRAWINGS

Preferred embodiments of an image processing device and image processing method according to the present invention will be described in detail based on the drawings:

FIGS. 4A to 4C explain the operation of bit map data generating processing in the first and second embodiments;

FIGS. 5A to 5C explain the operation of black object set generating processing in the first and second embodiments;

FIG. 6 shows the density conversion characteristics of a black object;

FIGS. 7A and 7B show the output result of an image according to prior art;

FIGS. 8A and 8B show the output result of an image according to another prior art;

FIGS. 9A and 9B show the output result of an image according to the first embodiment of the present invention;

FIG. 13 shows a transformed example of a near pixel;

FIG. 14 explains the operation of the second embodiment;

FIGS. 16A to 16C show the output result of an image according to prior art;

FIGS. 17A to 17C show the output result of an image according to another prior art; and FIGS. 18A to 18C show the output result of an image according to the second embodiment of the present invention.

DESCRIPTION OF THE PREFERRED EMBODIMENTS

1. First Embodiment 1.1. Configuration of the First Embodiment

Next, referring to FIG. 1, the configuration of a color printer equivalent to a first embodiment of the present invention will be described.

Figure 1:
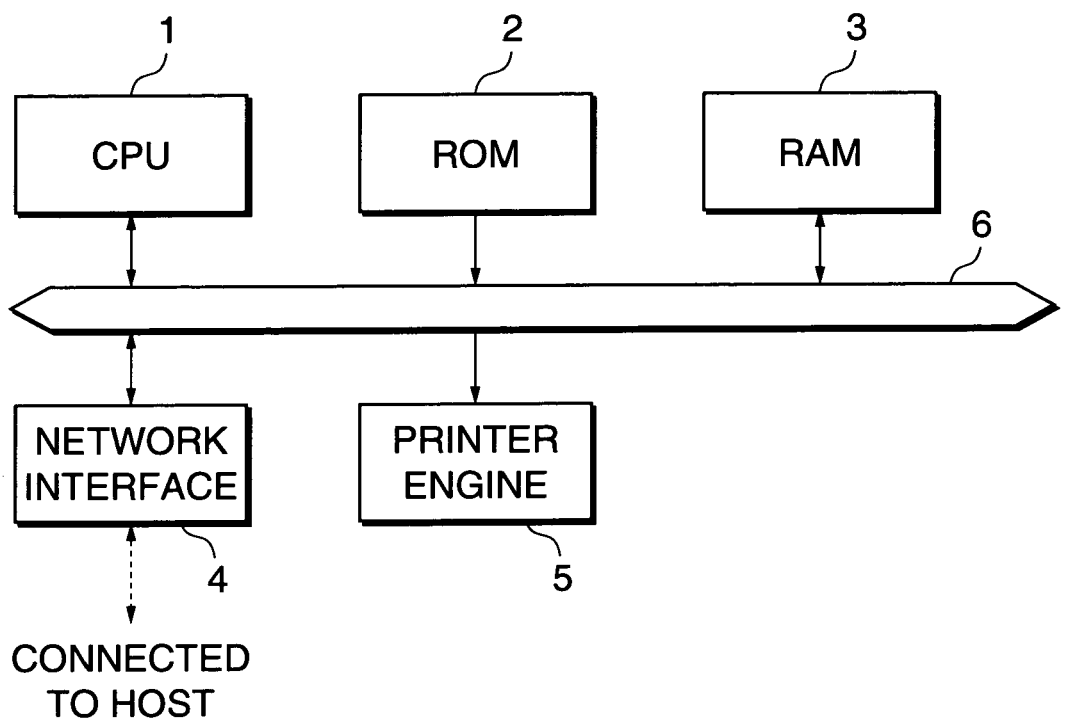
FIG. 1 is a block diagram showing the configuration of first and second embodiments of the present invention.

As shown in FIG. 1, a reference number 1 denotes CPU and it controls each unit via a bus 6 according to a program stored in ROM 2. A reference number 3 denotes RAM and it stores various parameters in the above program and image data under control by CPU 1. A reference number 4 denotes a network interface and it sends/receives data and others in page description language (PDL) to/from a host computer not shown. A reference number 5 denotes a printer engine and it outputs image data stored in RAM 3.

1.2. Operation of the First Embodiment

Figure 2:
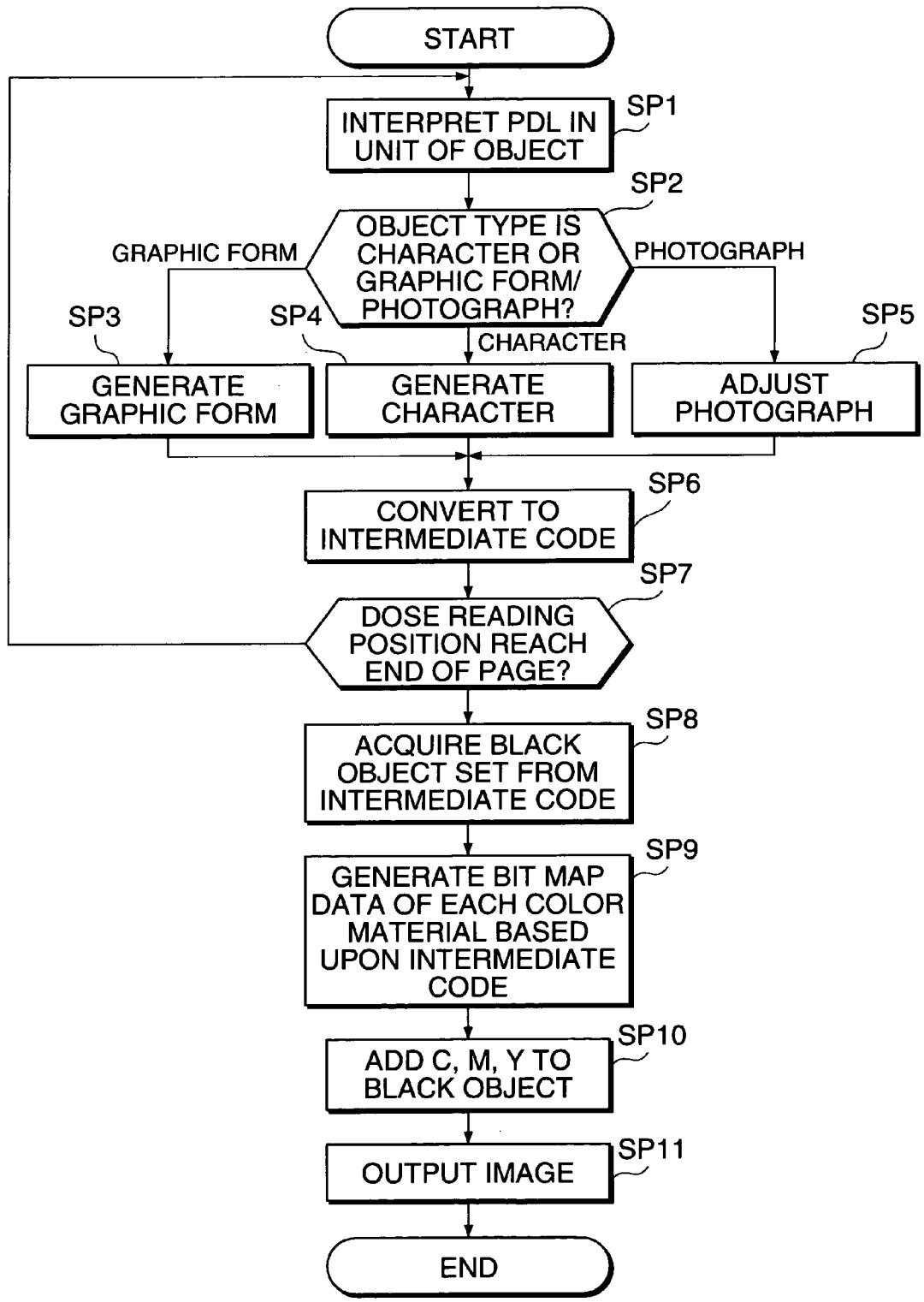
FIG. 2 is a flowchart showing a processing program in the first and second embodiments of the present invention.

When PDL data is supplied to a color printer via the network interface 4, the PDL data is stored in RAM 3 and a program shown in FIG. 2 is activated. When processing proceeds to a step SP1 as shown in FIG. 2, a first object of the PDL data is read and the contents are interpreted. Next, when processing proceeds to a step SP2, processing is branched according to the contents of the object. First, if the object is a graphic form, processing proceeds to a step SP3 and processing for generating the graphic form is executed. That is, as a complicated graphic form may be represented in PDL data, it is decomposed into a set of simple graphic forms.

Also, if the object is a character, processing proceeds to a step SP4 and processing for generating the character is executed. That is, font data is read from ROM 2 based upon a character code included in the PDL data. Also, if the object is a picture, processing proceeds to a step SP5, and the resolution/gradation conversion, color adjustment processing and others of the photograph are executed. When the processing in the steps SP3 to SP5 is finished, processing proceeds to a step SP6. In the step SP6, each object is converted to data called an intermediate code. An intermediate code is lower in the degree of abstraction than PDL data and is higher in the degree of abstraction than bit map data finally generated.

Figure 3:
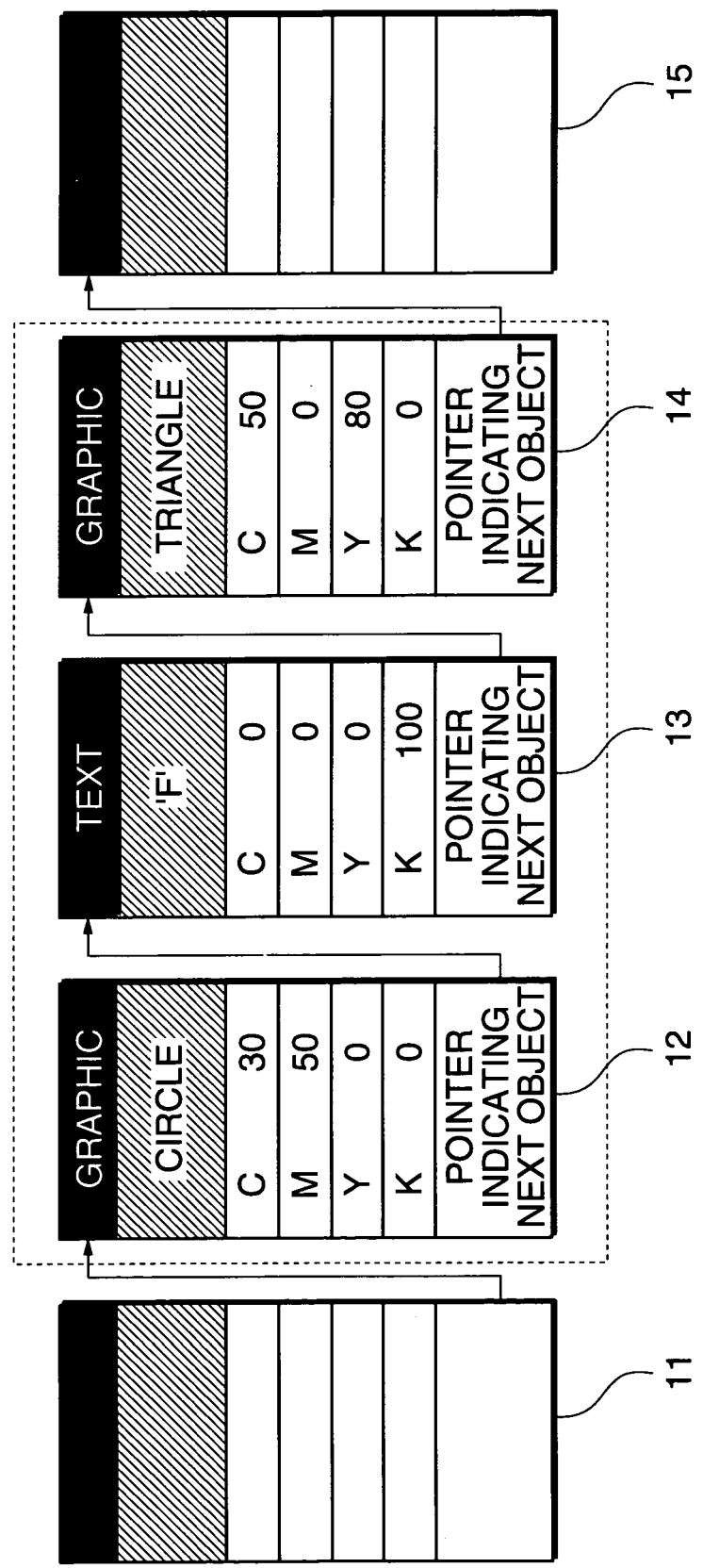
FIG. 3 shows the data configuration of an intermediate code object in the first and second embodiments.

FIG. 3 shows an example in case a display list is adopted as an example of an intermediate code. As shown in FIG. 3, reference numbers 11 to 15 denote objects in the display list and the object is composed of the type (a character (Text), a graphic form (Graphic) and a photograph (Photograph)), the shape (a circle, 'F', a triangle and others), the level of each color of KYMC composing the object and a pointer indicating the next object. Each object in an intermediate code is related by the above pointer.

Next, when processing proceeds to a step SP7, it is determined whether the reading position of read PDL data reaches the end of a page or not. When it is judged No in the above step, processing is returned to the step SP1 and the above processing is repeated for the next PDL data. When the reading position reaches the end of the page after the processing in the steps SP1 to SP7 is repeated, it is judged Yes in the step SP7 whether the reading position of the read PDL data reaches the end of the page or not and processing proceeds to a step SP8.

In the step SP8, an object in the display list is sequentially read and a set of black objects is generated. The set of black objects is represented by binary bit map data or a run length code. Next, when processing proceeds to a step SP9, the object in the display list is read again and bit map data every color material is generated. Referring to FIGS. 4A to 5C, the details of the processing in the steps SP8 and SP9 will be described below.

Assuming that a circular object 12 shown in FIG. 3 is at the head of an intermediate code, a circular image is formed in bit map data by reading the intermediate code as shown in FIG. 4A. In FIG. 4A, the object 12 is represented in one bit map, however, actually, bit map data is generated every plane of each color of KYMC. The above set of black objects is as shown in FIG. 5A. That is, as the object 12 is not a black object, the set of black objects has no contents.

Next, when an object 13 is read, the object 13 is drawn in bit map data with it overlapped with the object 12 as shown in FIG. 4B. At that time, a part overlapped with the object 13 of the object 12 is overwritten and as a result, is deleted. As the object 13 is composed of only black, a set of black objects is as shown in FIG. 5B.

Next, when an object 14 is read, the object 14 is drawn with it overlapped with the objects 12 and 13 in the bit map data as shown in FIG. 4C. At that time, a part overlapped with the object 14 of the objects 12 and 13 is overwritten and as a result, is deleted. As the object 14 is not an object composed of only black, a set of black objects is as shown in FIG. 5C and a part corresponding to the object 14 is deleted.

In the steps SP8 and SP9, the bit map data and the set of black objects are generated as described above. In the above example, the contents of the black plane in the bit map data and the set of black objects are coincident, however, both are generally not necessarily coincident. That is, if an object is a photograph, the following area is not included in the above set of black objects even if the area composed of only black exists inside. This reason is that the object of a photograph is required to be retrieved in units of pixel to identify a black area.

When the above processing is applied to all intermediate code objects, processing proceeds to a step SP10 and the contents of a corresponding part in the bit map data are converted based upon the set of black objects. FIG. 6 shows the above conversion characteristic. If the density of black is low in the drawing, the contents of the bit map data are not changed before and after the conversion. However, when the density of black exceeds a predetermined value, color material of Y, M, C is added by slight amount. As shown in FIG. 6, it is suitable that the amount of each color material is determined according to the density of black in the original bit map data. It is desirable that the conversion characteristic shown in FIG. 6 is stored in ROM 2 and others as a table beforehand.

It is suitable that the amount of each color material of Y, M, C is set in a range of 10 to 40% (percentage by weight) of the amount of black material, it is preferable that the above amount is set in a range of 10 to 25% and most desirably, if the above amount is set in a range of 10 to 15%, an impressive output result is acquired. The amount of each color material of Y, M, C is not required to be equal. With these amounts of color materials, any color of Y, M and C is not conspicuous even though the misregistration has occurred.

Next, when processing proceeds to a step SP11, an image of the converted bit map data is output on paper and others. FIG. 9 shows the result of printing of the image output by the above processing and its sectional view. As shown in FIG. 9, if the density of black of the black object is fixed (the density of black is fixed in a general character and others), fixed density of color material of YMC is overlapped on black material. Hereby, the phenomenon that an edge pales shown in FIG. 7 is prevented. Further, the problem shown in FIG. 8 that the color material in different amount of Y, M, C is overlapped though the density of black in the original bit map data is equal can be also prevented beforehand.

2. Second Embodiment

Next, a second embodiment of the present invention will be described. The configuration of hardware in the second embodiment is similar to that in the first embodiment shown in FIG. 1 and the configuration of a program is also approximately similar. However, in this embodiment, the contents of processing for adding Y, M, C in the step SP10 shown in FIG. 2 differ from those in the first embodiment. That is, in this embodiment, when processing proceeds to a step SP10, each pixel which belongs to a set of black objects is sequentially targeted and a program shown in FIG. 10 is activated every target pixel.

Figure 11:
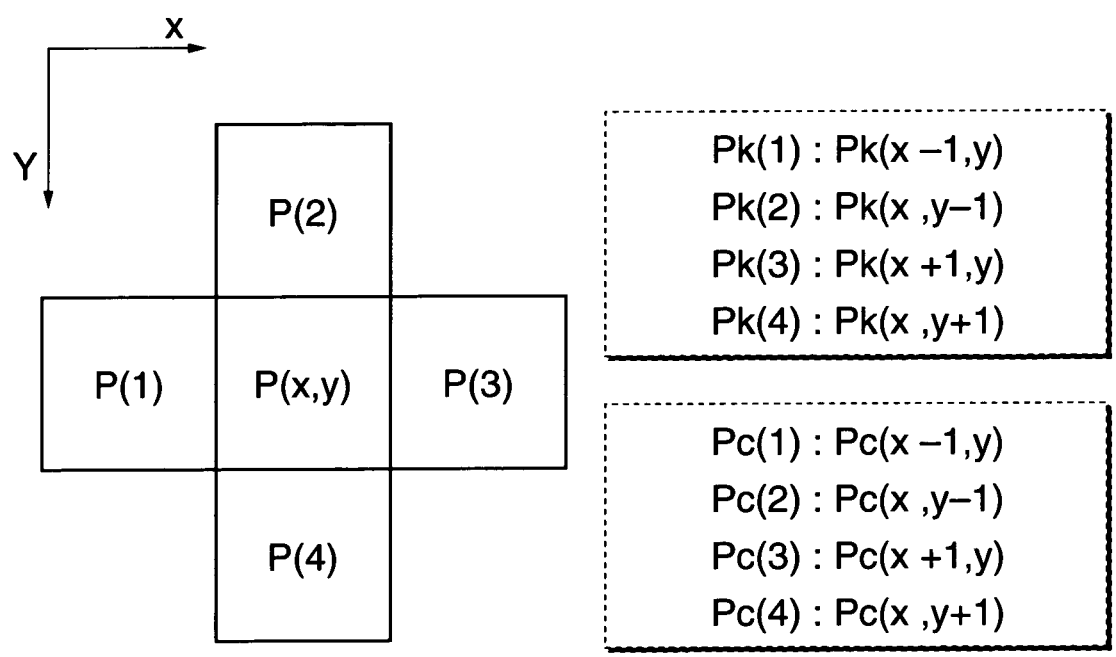
FIG. 11 explains a pixel value.

In the above program, the coordinates of a target pixel in bit map data are represented as P(x, y). As shown in FIG. 11, pixel values adjacent to the target pixel in a horizontal scanning direction and in a vertical scanning direction on a black plane are represented as Pk(1), Pk(2), Pk(3) and Pk(4). Similarly, pixel values adjacent to the target pixel in the horizontal scanning direction and in the vertical scanning direction on the plane of Y, M or C are represented as Pc (1), Pc(2), Pc(3) and Pc(4).

Figure 10:
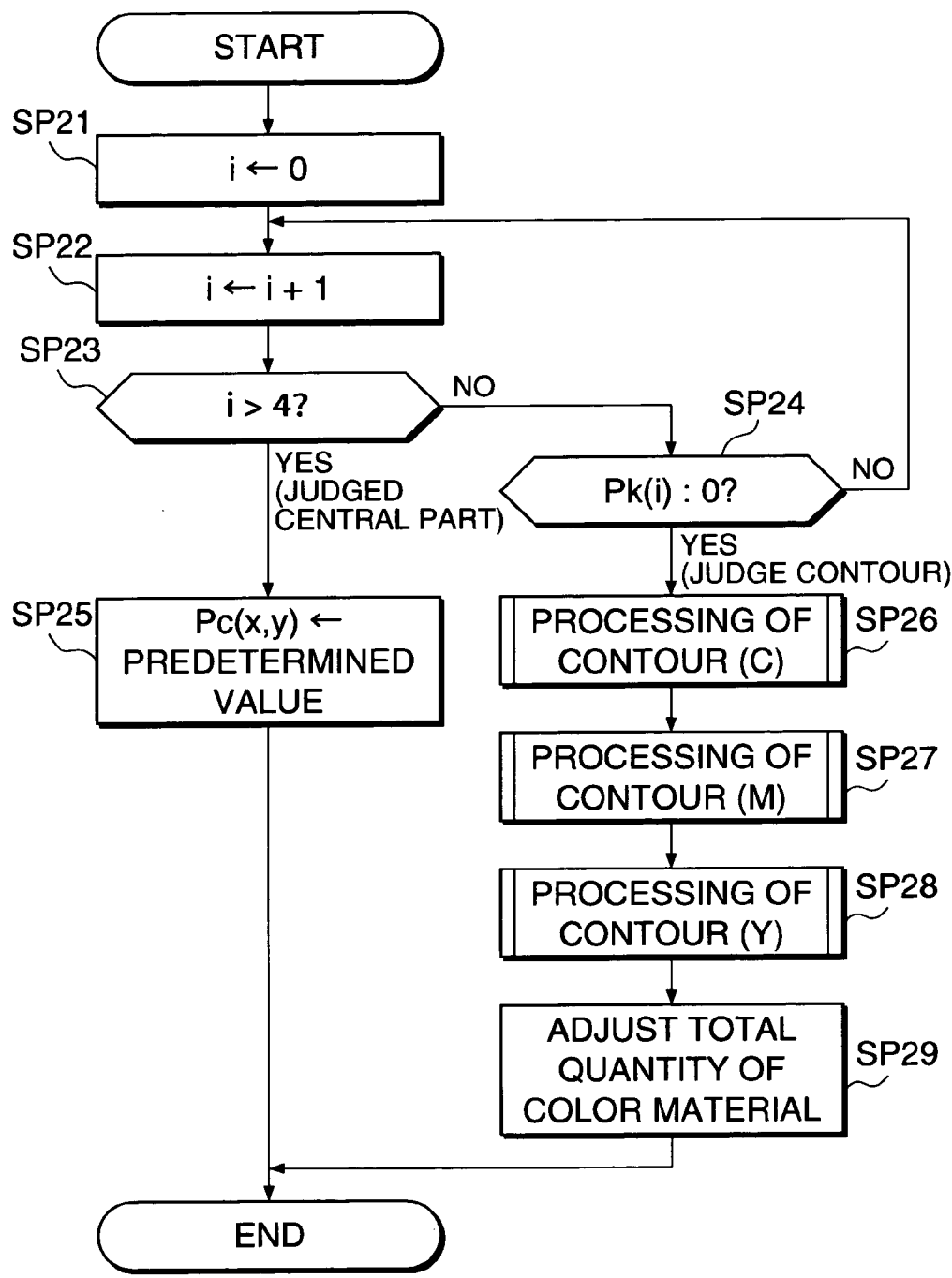
FIG. 10 is a flowchart showing a processing program in the second embodiment of the present invention.

When processing proceeds to a step SP21 shown in FIG. 10, zero is substituted for a variable i. Next, when processing proceeds to a step SP22, the variable i is incremented by one. Next, when processing proceeds to a step SP23, it is determined whether the variable i exceeds 4 or not. If it is judged No in the above step, processing proceeds to a step SP24. In the step, it is determined whether a pixel value Pk(i) is zero or not. If the pixel value is not zero, it is judged No, processing is returned to the step SP22 and the variable i is incremented by one again.

Therefore, unless all pixel values Pk(1), Pk(2), Pk(3) and Pk(4) are zero (in other words, if all pixels around the target pixel include a black component), it is always judged No in the step SP24 whether the pixel value Pk(i) is zero or not. When the variable i becomes 5, it is judged Yes in the step SP23 whether the variable i exceeds 4 or not and processing proceeds to a step SP25. In the step, it is estimated that the target pixel belongs to a part (hereinafter, referred to as the center) except the contour of a black area and a value of the target pixel Pc(x, y) on the plane in Y, M, C is set to a predetermined value (see FIG. 6) according to the density of black.

In the meantime, when it is detected that any of the pixel values Pk(1), Pk(2), Pk(3) and Pk(4) is zero, it is judged No in the step SP24 whether the pixel value Pk(i) is zero or not.

Figure 12:
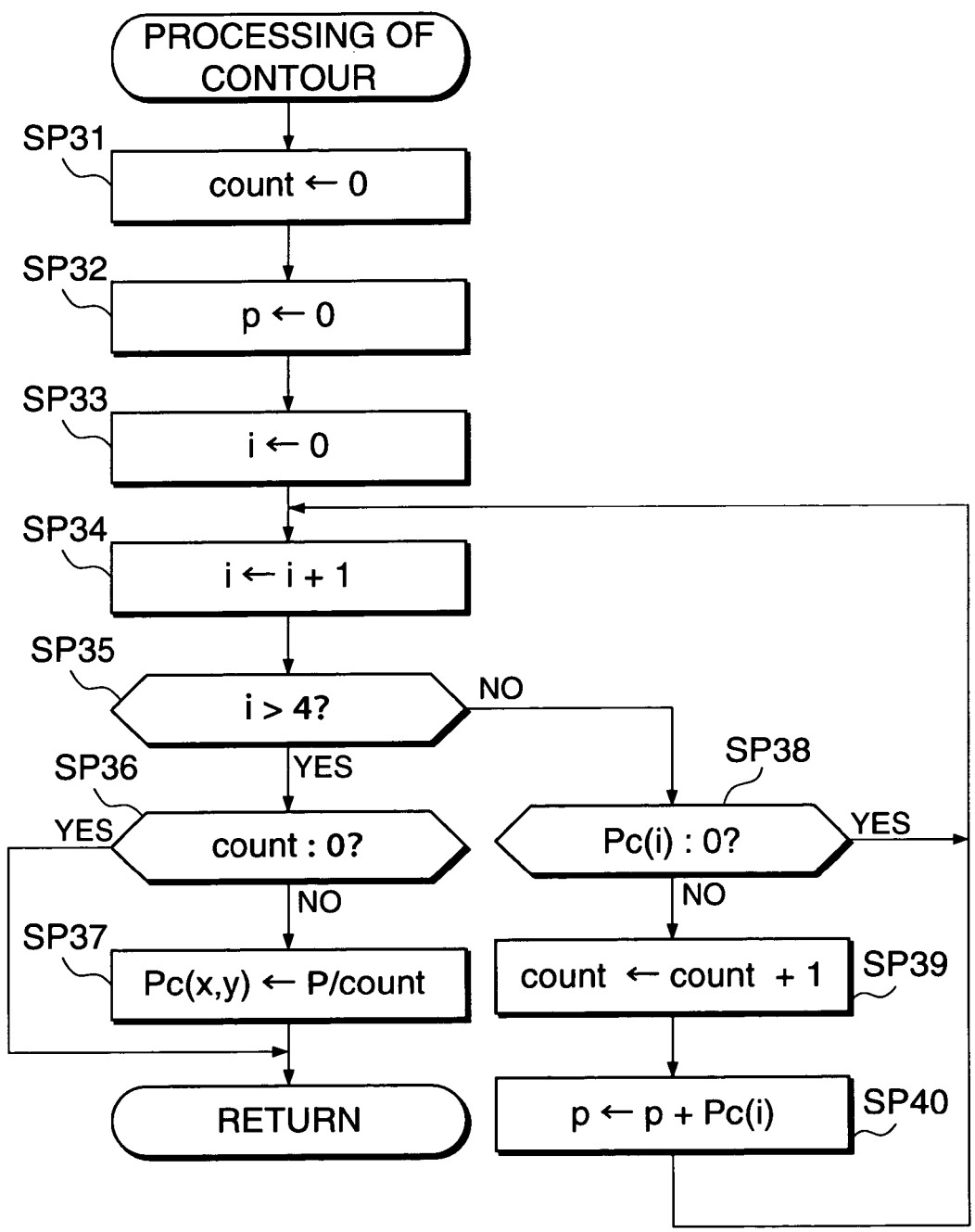
FIG. 12 is a flowchart showing a subroutine in the processing program in the second embodiment.
Figures 15A, 15B:
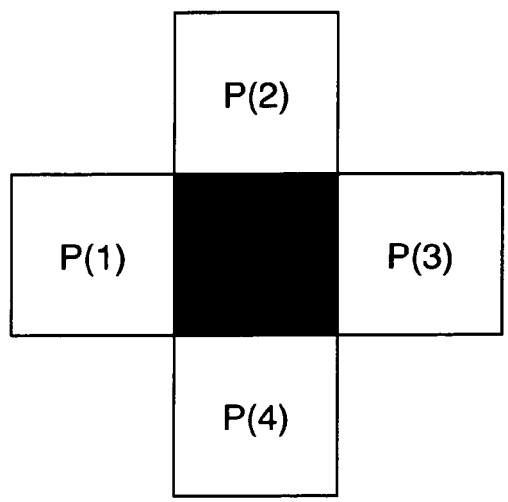
FIGS. 15A and 15B explain the operation of the second embodiment.

That is, it is estimated that the target pixel is the contour (the edge). Next, when processing proceeds to a step SP26, a subroutine shown in FIG. 12 is called and the contour of a cyan area is processed. As an example, processing in case the values of four near pixels of the target pixel are as shown in FIG. 15B will be described below.

As shown in FIG. 12, in steps SP31 to SP33, a variable count, a variable p and a variable i are all set to zero. Next, when processing proceeds to a step SP34, the variable i is incremented by one to be one. Next, in a step SP35, it is determined whether the variable i exceeds 4 or not. If the variable i does not exceed 4, it is judged No and processing proceeds to a step SP38. In the step, it is determined whether a pixel value Pc(i), that is, a pixel value Pc(1) is zero or not. As a pixel value Pc(1) on the cyan plane is 70 in an example in FIG. 15B, it is judged No and processing proceeds to a step SP39. In the step, the variable count is incremented by one to be one. That is, if a pixel value on a target plane is except zero out of four near pixels of the target pixel, the variable count is incremented.

Next, when processing proceeds to a step SP40, a pixel value Pc(i), that is, 70 is added to the variable p and the variable p becomes 70. Next, when processing is returned to the step SP34, the variable i is incremented to be 2. Processing proceeds to the step SP38 again via the step SP35. The pixel value Pc(i), that is, the pixel value Pc(2) is 50 according to FIG. 15B. Therefore, in the step SP38, it is judged No whether Pc(i) is zero or not and the steps SP39 and SP40 are executed again. That is, the variable count becomes 2, 50 is added to the variable p and the variable p becomes 120.

Next, when processing is returned to the step SP34, the variable i is incremented to be 3. Next, processing proceeds to the step SP38 via the step SP35. As the pixel value Pc(i), that is, the pixel value PC(3) is zero, it is judged Yes in the step SP38 whether Pc(i) is zero or not and processing is returned to the step SP34. Next, similar processing is also executed as to the pixel value Pc(4), as the pixel value Pc (4) is also zero, it is judged No in the step SP38 and processing is returned to the step SP34. Next, when the variable i is incremented to be 5, it is judged Yes in the step SP35 whether the variable i exceeds 4 or not and processing proceeds to a step SP36.

In the step, it is determined whether the variable count is zero or not. In the above example, the step SP39 is executed twice, it is judged No because the variable count is 2 and processing proceeds to a step SP37. In the step SP37, 60 which is the result acquired by dividing the variable p (120) by the variable count (2) is set as a value of the target pixel Pc(x, y) on a target plane (the cyan plane). As described above, it is known that the value of the target pixel Pc(x, y) on the target plane (the cyan plane) is set to the average value of near pixel values which are not zero out of four near pixel values of the target pixel. When the above processing is finished, processing is returned to the calling original routine shown in FIG. 10. In the steps SP27 and SP28 shown in FIG. 10, the similar processing of magenta and yellow to cyan described above is executed.

In the above processing, if a black object and an object not including black are adjacent, the latter area is expanded and its edge is overlapped with the black object. This reason is that a black object is often a character and in consideration of the quality of an image, it is not realistic to expand a character.

Next, when processing proceeds to a step SP29, the total amount of color material of KYMC is adjusted. This reason is that if the amount of color material acquired in the processing before the step SP29 is output as it is, a failure of printing may occur. Then, in the step SP29, if the total amount of color material exceeds predetermined amount, the pixel values of Y, M, C in the target pixel are reduced.

FIG. 14 shows an example in case the total amount of color material comes into question. As shown in FIG. 14, the amount of each color material is determined according to the method described referring to FIG. 15 and the total is 290. If an allowable value of the total amount of color material is 260, the total in the example shown in FIG. 14 is over by 30. In this case, if each amount of Y, M, C is reduced by the same value, the amount of each color material has only to be reduced so that each amount of C, M, Y, K is 50, 50, 60, 100. A method of reducing the amount of color material of YMC is not limited to the method of reducing by the same value but may be also a method of reducing by the same ratio and a method of reducing according to nonlinear relationship referring to a table and others.

When the above processing is completed, images are output on paper and others based upon bit map data after conversion as in the first embodiment.

FIG. 18 shows the result of printing an image and its sectional view. As in the first embodiment, if the density of black of a black object is fixed, fixed density of color material of YMC is overlapped on the black material. Hereby, the phenomenon that an edge pales shown in FIGS. 16 and 17 is prevented. Further, in this embodiment, a problem due to misregistration is also made inconspicuous by trapping.

3. Transformed Examples

The present invention is not limited to the above embodiments and for example, can be variously transformed as follows.

(1) In the above embodiments, the color printer is described as the example, however, it need scarcely be said that the present invention can be applied to a color copying machine and the other image output part. Particularly, a color copying machine wherein the different types of images such as a character, a line and others in which resolution should be given precedence and a photograph and others in which gradation should be given precedence can be separated is known. In this case, it is desirable that similar processing to the above processing is applied to an area judged a character and a line after separation.

(2) In the above embodiments, the amount of color material of YMC added to the contour of a black object is determined based upon the values of four near pixels of a target pixel. However, needless to say, the amount of color material may be also determined referring to the values of another near pixels. FIG. 13 shows an example in case as an example of near pixels, near 4 pixels, near 8 pixels, near 12 pixels and near 20 pixels are adopted.

As for determination of whether a target pixel is a contour or not (the steps SP21 to SP24 shown in FIG. 10), the above near pixels are also adopted. In the above embodiments, it is determined based upon peripheral four pixels on a black plane (the pixel values Pk(1), Pk(2), Pk(3) and Pk(4)) whether a target pixel is a contour or not, however, it may be also determined based upon near 8 pixels, near 12 pixels, near 20 pixels and other near pixels.

(3) In the step SP37 in the above second embodiment, the value of the target pixel Pc(x, y) on the target plane (the cyan plane) is set to the average value of the values which are not zero of the four near pixels around the target pixel. However, independent of whether the above values are zero or not, the value of the target pixel Pc(x, y) may be also set to a value acquired by simply averaging the values of near 4 pixels (or near 8 pixels, near 12 pixels or near 20 pixels).

As described above, according to the present invention, as processing such as adding color material except black material to a black area by predetermined amount regardless of the contents of image data in an area except the black area is executed, the phenomenon that an edge is paled is effectively prevented and high speed processing is enabled.

What is claimed is:

1. An image forming device, comprising:
    a receiving part that receives image data including a color object and a black object, the color object constituting a background of the black object;
    determining part that determines a first amount which is an amount of a black material to be applied to a black area corresponding to the black object and a second amount which is an amount of color materials to be applied to the black area, the determining part determining each of the first and second amounts based on density of the black object regardless of the color object; and
    an output part that outputs the first and second amounts to the black area,
    the image forming device further comprising:
        an edge detector that detects an edge of the black area, wherein, the determining part determines a third amount which is an amount of the color materials to be applied to a periphery of the edge, and the output part outputs the third amount to the periphery of the edge.

2. The image forming device according to claim 1, wherein the output part outputs the second amount to the black area after the first amount is output to the black area.

3. The image forming device according to claim 1, wherein each of the first and second amounts is more than zero.

4. The image forming device according to claim 1, wherein the output part outputs the first and second amounts to the black area being positioned on a recording medium including a paper.

5. The image forming device according to claim 1, wherein,
    the color materials include primary colors of yellow (Y), magenta, (M), and cyan (C), and the determining part determines each amount of the color materials of the Y, M, and C in a range of 10 to 40% (percentage by weight) of the first amount.

6. The image forming device according to claim 5, further comprising,
    a reduction unit that reduces each of the amounts of the color materials of the Y, M, and C without reducing the first amount when a total amount of the first and second amounts exceeds a predetermined amount.

7. The image forming device according to claim 5, further comprising,
    an adjuster that adjusts at least one of the second and third amounts when the determining part determines a total amount of the first, second and third amounts to exceed a predetermined amount.

8. An image forming method, comprising:
    receiving image data including a color object and a black object, the color object constituting a background of the black object;
    determining a first amount which is an amount of a black material to be applied to a black area and a second amount which is an amount of color materials to be applied to the black area, wherein each of the first and second amounts is determined based on density of the black object regardless of the color object; and
    outputting the first and second amounts to the black area,
    the image forming method further comprising:
        detecting an edge of the black area, wherein, determining a third amount which is an amount of the color materials to be applied to a periphery of the edge, and outputting the third amount to the periphery of the edge.

9. The image forming method according to claim 8, wherein outputting the second amount to the black area after the first amount is output to the black area.

10. The image forming method according to claim 8, wherein each of the first and second amounts is more than zero.

11. The image forming method according to claim 8, wherein outputting the first and second amounts to the black area being positioned on a recording medium including a paper.

12. The image forming method according to claim 8, wherein,
    the color materials include primary colors of yellow (Y), magenta (M), and cyan (C), and determining each amount of color materials of the Y, M, and C in a range of 10 to 40% (percentage by weight) of the first amount.

13. The image forming method according to claim 12, further comprising,
    reducing each of the amounts of the color materials of the Y, M, and C without reducing the first amount when a total amount of the first and second amounts exceeds a predetermined amount.

14. The image forming method according to claim 8, further comprising,
    adjusting at least one of the second and third amounts when the determining part determines a total amount of the first, second and third amounts to exceed a predetermined.

15. A computer readable medium storing a program causing a computer having an image forming device to execute a process for image forming, the process comprising:
    receiving image data including a color object and a black object, the color object constituting a background of the black object;
    determining a first amount which is an amount of a black material to be applied to a black area corresponding to the black object and a second amount which is an amount of color materials to be applied to the black area, wherein each of the first and second amounts is determined based on density of the black object regardless of the color object; and
    outputting the first and second amounts to the black area,
    the image forming device further comprising:
        a storing part that stores characteristic which is used for determining the first amount and the second amount based on the density of the black object, wherein the determining part determines the first and second amounts based on the characteristic.

16. An image forming device, comprising:
    a receiving part that receives image data including a color object and a black object, the color object constituting a background of the black object;
    determining part that determines a first amount which is an amount of a black material to be applied to a black area corresponding to the black object and a second amount which is an amount of color materials to be applied to the black area, the determining part determining each of the first and second amounts based on density of the black object regardless of the color object; and an output part that outputs the first and second amounts to the black area, the image forming device further comprising:

a storing part that stores characteristic which is used for determining the first amount and the second amount based on the density of the black object, wherein the determining part determines the first and second amounts based on the characteristic.

17. An image forming method processed by an image forming device, comprising:

receiving image data including a color object and a black object, the color object constituting a background of the black object;

determining a first amount which is an amount of a black material to be applied to a black area and a second amount which is an amount of color materials to be applied to the black area, wherein each of the first and second amounts is determined based on density of the black object regardless of the color object; and outputting the first and second amounts to the black area, the image forming device further comprising:

a storing part that stores characteristic which is used for determining the first amount and the second amount based on the density of the black object, wherein the determining part determines the first and second amounts based on the characteristic.

* * * * *